United States Patent [19]
Bowell et al.

[11] 3,725,328
[45] Apr. 3, 1973

[54] LATEX COATING COMPOSITION HAVING YIELD VALUES OF 95-550 DYNES/CM$^2$ AND SHEAR STRESS OF AT LEAST 90 DYNES/CM$^2$ AT SHEAR RATE OF ABOUT 0.1-0.2/SEC.

[75] Inventors: S. T. Bowell, North Olmstead; Robert Ashcroft, Strongsville; G. E. Pekarek, Cleveland, all of Ohio

[73] Assignee: SCM Corporation, Cleveland, Ohio

[22] Filed: Oct. 26, 1970

[21] Appl. No.: 84,192

[52] U.S. Cl. ............260/29.6 R, 117/161 U, 260/8, 260/17 A, 260/17 R, 260/17.4 ST, 260/29.6 XA, 260/29.6 H, 260/29.6 AN, 260/29.7 R
[51] Int. Cl. .............................................C08f 45/24
[58] Field of Search ...................................260/29.6 R

[56] References Cited

UNITED STATES PATENTS

| | | | |
|---|---|---|---|
| 3,326,848 | 6/1967 | Clemens et al. | 260/29.6 R |
| 3,561,003 | 2/1971 | Lanham et al. | 260/29.6 R |
| 2,909,449 | 10/1959 | Banigan | 260/29.6 R |
| 3,085,985 | 4/1963 | Koch et al. | 260/29.6 R |
| 3,220,965 | 11/1965 | Ambler | 260/29.6 R |
| 3,487,031 | 12/1969 | Muroi et al. | 260/29.6 R |
| 3,578,618 | 5/1971 | Beardsley | 260/29.6 R |
| 3,310,513 | 3/1967 | Barie et al. | 260/29.6 R |

OTHER PUBLICATIONS

Kunstoffe, Vol. 53, July, 1963, p. 21.

*Primary Examiner*—Harold D. Anderson
*Attorney*—Merton H. Douthitt, Harold M. Baum, Howard G. Bruss, Jr., Russell L. Brewer and James E. Carson

[57] ABSTRACT

Novel compositions of aqueous compounded latex coatings adapted for airless spray application comprising film-forming latex and pigmentation dispersed in a bodied aqueous medium and exhibiting a defined yield point having a preferred shear stress of at least 90 dynes/cm$^2$ at a shear rate of between about 0.1 and 0.2 reciprocal seconds are described. A process for airless spray surface coating using the compositions of this invention and coated articles obtained thereby are also described.

2 Claims, No Drawings ns,328

LATEX COATING COMPOSITION HAVING YIELD VALUES OF 95-550 DYNES/CM AND SHEAR STRESS OF AT LEAST 90 DYNES/CM² AT SHEAR RATE OF ABOUT 0.1-0.2/SEC.

BACKGROUND OF THE INVENTION

This invention pertains to novel coating compositions and more particularly to aqueous compounded latex coating compositions adapted for airless spray application. This invention is advantageous in that surfaces can be coated with up to about 60 mils of wet film of the coating compositions without sagging or intermediate drying of the coating and without defects such as pinholes, mudcracking, etc.

SUMMARY OF THE INVENTION

The present invention provides novel coating compositions of aqueous compounded latex coatings adapted for airless spray application comprising film-forming latex and pigmentation dispersed in a bodied aqueous medium and being characterized by a defined yield point having a preferred shear stress of at least 90 dynes/cm² at a shear rate of between about 0.1 and about 0.2 reciprocal seconds.

Compositions falling with the scope of this invention can coat substrates with up to a thickness of about 60 mils without significant sagging or slumping of the coating and without the necessity of intermediate drying.

DESCRIPTION OF THE PREFERRED EMBODIMENTS

It has unexpectedly been found that the coating compositions of this invention can be applied to substrates as an airless spray in a thickness of up to 60 mils or more in a series of sequential atomized passes, having at least one pass of about 5 mils to about 15 mils of thickness without significant sagging or slumping of the wet film.

The coating compositions of this invention, when applied to a surface in the above thickness, have excellent hiding characteristics and effectively coat and render indistinguishable small surface flaws and irregularities without the necessity of using large amounts of expensive hiding pigments.

These coating compositions exhibit high shear stress at low shear rates which permits thick film application without sagging.

The coating compositions of this invention have a yield value, hereinafter defined, of between about 95 and about 550 dynes/cm² and have a shear stress of at least 90 dynes/cm² at a shear rate of between about 0.1 and about 0.2 reciprocal seconds. If the shear yield value is below about 95 dynes/cm², the films made from the compositions will tend to slump or sag at wet film thicknesses of about 25 to 30 mils. If the yield value is above 550 dynes/cm², the compositions will sometimes not be usable due to the inability of forcing the compositions through an airless spray nozzle.

The term "yield value" is a calculated value based on physical measurements of the coating compositions herein defined. This value is described on page 132 of a publication entitled, "Paint Flow and Pigment Dispersions," by T. C. Patton, published by Interscience Press in 1964. The equation used in determining yield value is $$X = To/p \cdot g$$

where
$X$ is wet film thickness of the slumping section in centimeters;
$To$ is yield expressed in dynes/cm²;
$p$ is density in grams/cm³; and
$g$ is a gravitational constant equivalent to 980 cm per sec².

Coating compositions of this invention are further characterized in having a shear stress of at least 90 dynes/cm² at a shear rate of between about 0.1 and about 0.2 reciprocal seconds. Advantageous compositions falling within the scope of this invention have a shear stress of between about 90 and about 550 dynes/cm² at a shear rate of between about 0.1 and about 0.2 reciprocal seconds. The film thickness obtainable by a particular composition will depend, to some extent, on the shear stress within the above-mentioned shear rates, the lower film thicknesses corresponding to the lower shear stress exhibited by the composition. Coating compositions having a shear stress below 90 dynes/cm² will often form undesirably thin films or films which slump or sag. Although coating compositions having a shear stress of about 550 dynes/cm² may sometimes be usable to form films, there is usually no advantage; and compositions having such high shear stress often present handling difficulties when the material is applied to a surface as a coating.

The present invention is concerned with aqueous compounded latex coating compositions having herein described shear stress characteristics which contain, in addition to water:
a. pigmentary material, including conventional hiding pigments, fillers and/or extenders;
b. resinous film-forming material, i.e., a conventional emulsion polymerized synthetic resinous material in latex form;
c. additional film-forming materials, i.e., diluents or modifiers present as water-insoluble dispersed particles in the emulsion — such as plasticizer emulsions added to the latex emulsion; and
d. emulsifiers or dispersing assistants.

The water content of the compositions of this invention can vary appreciably, but for most purposes, the water should constitute between about 19 percent and about 25 percent by weight of the finished composition. If the compositions contain below about 19 percent water, their thickness and viscosity greatly reduces the ease and efficiency of airless spray application. Compositions containing above about 25 percent water do not have the desired film thickness when applied to a surface. Compositions containing from about 20 percent to about 22 percent water by weight of the finished composition have been found to be particularly preferable.

Suitable pigment materials for incorporation in the compositions of this invention are conventional and can include white opacifying agents such as rutile or anatase titania, extenders such as lithopone, calcium sulfate, zinc oxide, sodium silico-aluminate, magnesium aluminum silicate, crystalline silica, amorphous silica, talc, mica, Wollastonite, calcium carbonate, barium sulfate, clay, fuller's earth, diatomaceous earth, and the like, which may or may not have opacifying properties; and mixtures of these pigmentary materials.

Additional conventional pigmentary materials or colorants can be used to impart color to the composition; for example, ferrite yellow oxide, ferric oxide, "-brown" iron oxide (which is a blend of red, yellow and black iron oxides), tan oxides of iron (which is a similar blend), raw and burnt sienna, raw and burnt umber, chromium oxide green, phthalocyanine green (chlorinated copper phthalonitrile), the green iron salt of nitroso beta naphthol, copper phthalonitrile blue, ultramarine blue, carbon black, lamp black, toluidine red, parachlor red, para toner (red), alkali-resistant red, BON red and maroon, cadmium reds and yellows, Watchung red, madder lake (red), Duratone red, carmine red, chrome yellow (lead chromate), chrome orange, Hansa yellows (which are azo couplings of metanitroparatoluidine and acetoacetanilide) and golden nickel azo complexes.

The coating compositions of this invention advantageously have a pigment volume concentration of between about 45 percent and about 70 percent, preferably between about 47 percent and about 60 percent. Such coating compositions generally have the desired rheological properties. The most preferred embodiment of the composition has a pigment volume concentration of between about 50 percent and about 55 percent. Such compositions exhibit a definite yield point.

Preferably the pigment particles consist essentially of a mixture of calcium carbonate, titanium dioxide, crystalline silica, sodium silico-aluminate and magnesium aluminum silicate. Most advantageously, the pigment particle mixture contains, in weight percent basis the weight of the composition, from about 7 percent to about 18 percent calcium carbonate, from about 8 percent to about 16 percent titanium dioxide, from about 8 percent to about 20 percent crystalline silica, from about 0.8 percent to about 3.0 percent sodium silico-aluminate, and from about 0.0 percent to about 0.5 percent magnesium aluminum silicate. If the pigment particle mixture contains less than the minimum percentage of the above pigments, the hiding power will be less than desirable. It is economically disadvantageous if the mixture contains more than the maximum percentages of the above component's pigments.

The preferred average particle size range of the pigment particle is: crystalline silica particles — from about 5 microns to about 50 microns, calcium carbonate — from about 0.06 microns to about 40 microns, magnesium aluminum silicate — from about 0.3 microns to about 5.0 microns, titanium dioxide — from about 0.2 microns to about 0.4 microns, and sodium silico-aluminate — with an average particle size of about 0.02 to about 0.04 microns.

The above-described average particle size ranges of the pigment particles is critical if the compositions are to fall within the on values and shear stress hereinbefore described.

Additionally, the composition can contain bodying agent and dispersing assistant if desired. Suitable bodying agents which can be used include water-soluble methyl cellulose, hydroxy ethyl cellulose, sodium carboxy methyl cellulose, bentonite clay, attapulgite clay and alkali metal caseinates exhibiting similar viscosity characteristics. Other water-soluble colloidal materials such as easily water-soluble natural gums including gum tragacanth, locust bean gum, Karaya gum, guar gum, Irish moss gum and alkali alginates also can be used; but they are more susceptible to bacterial spoilage and are therefore considerably less advantageous.

The bodying agent in the composition should be dispersible to form at least a colloidal suspension and, preferably, should be soluble in water. The preferred one is hydroxypropyl methyl cellulose in a proportion broadly between 0.1 and 0.5, and preferably between 0.15 and 0.25 based on the weight of the finished coating composition.

Dispersing assistants and emulsifiers which can be employed in this invention include anionic surfactants such as alkali metal salts of an alkylbenzene sulfonic acid; nonionic surfactants such as ethylene oxide condensates of octyl phenol; and anionic surfactants such as the sodium or ammonium salts of sulfate esters of such nonionic surfactants. Effective proportions of such surfactants are generally a little higher than those for the alkali metal phosphate dispersing assistants. Use of too great a proportion of such dispersing assistant or assistants may cause the resulting paint to have poor water resistance.

Dispersing assistants and emulsifiers can be employed in this invention in amounts from about 0.01 percent to about 1.0 percent, based on the weight of the final composition.

The dispersing assistant or emulsifier employed is advantageously an alkali metal polyphosphate, preferably from about 0.06 percent to about 0.1 percent, based on the weight of the finished composition, of sodium hexametaphosphate or tetrasodium pyrophosphate and sodium tri-polyphosphate. If less than 0.01 percent dispersing agent is employed, the dispersing action will be detrimentally affected. More than 1.0 percent of dispersing agent may be employed, but it is not economically advantageous.

Other materials which can be incorporated into the composition include from about 0.1 percent to about 2.0 percent by weight preservatives and pesticides for protection of the coating composition against microbia or fungus attack, e.g., phenyl mercury compounds (acetate, propionate, oleate, etc.), phenolic pesticides such as orthophenylphenol and its sodium salt, chlorinated phenols, mixtures of the same, and the like.

There is, of course, a broad spectrum of film-forming latices available. Broadly, the most suitable latices have small particle size for coalescing and becoming film-forming and for exhibiting good pigment binding qualities, e.g., latices averaging about 1,500A. to about 3,000A. The average resin particle size can advantageously vary from about 1,000A. to about 6,000A. Preferred latices can have average particle size from about 1,500A. to about 3,000A.

Homopolymers, copolymers and terpolymers can be employed in the compositions of this invention. Copolymers are preferred because homopolymers usually have a glass transition temperature outside the range most advantageous for the film-forming properties of this invention.

The suitable latices can render the resulting coating composition adequate for outdoor application as well as indoor finishing. Ordinarily, these latices are made by emulsion polymerization and suitable emulsions include those of vinyl resins including vinyl acetate, vinyl chloride, vinylidene chloride, and the like; those of hydrocarbon polymers and copolymers, polyethylene, polypropylene and oxygenated on halogenated derivatives of same including polybutadiene, oxygenated polybutadiene, polyisoprene, oxygenated polyisoprene, butadiene-styrene, butadiene-vinyl toluene isoprene-styrene and the like; acrylic latices including polymers and copolymers containing units of acrylic acid, methacrylic acid, their esters, and acrylonitrile; alkyds, reaction products of vinylic hydrocarbon monomers with unsaturated materials such as the reaction product of maleic acid with styrene; and, broadly, the various other resinous and rubber-like elastomeric products which are obtainable in stable aqueous latex form and are capable of coalescing into a pigmented film when sprayed onto a surface at ordinary room conditions, i.e., 75° F., 25 percent relative humidity, and one atmosphere total pressure.

The coating compositions of this invention preferably contain from about 10 percent to about 35 percent, basis the weight of the composition, of film-forming latex. For the most advantageous coating and hiding characteristics, the latex preferably is characterized in having a glass transition temperature of from about 0° C. to about 24° C. and an average particle size from about 1,000 A. to about 5,000A. The compositions have diminished film-forming properties if the latex has a glass transition temperature above about 24° C. Preferably, the latex is an emulsion polymerized ethylenic unsaturated copolymer having an average particle size between about 1,500A. and about 3,000A. The most preferred coating composition of this invention contains an emulsion polymerized unsaturated copolymer wherein the monomer composition consists of from about 70 to about 95 weight percent of vinyl acetate and from about 30 to about 5 weight percent of 2-ethylhexyl acrylate.

The compounded latex of this invention will tolerate water, hydrophilic protective colloids such as water-soluble hydroxy ethyl cellulose, carboxymethyl cellulose, sodium caseinate, natural gums such as gum tragacanth, locust bean gum, Karaya gum, guar gum, Irish moss gum, and alkali metal alginates; small amounts from about 0.2 percent to about 1.0 percent of low boiling hydrocarbon solvents such as $C_{6-9}$ aliphatics (generally referred to as naphthas) for reduction of foaming; various surfactants, e.g., anionics such as sodium dodecyl benzene sulfate and sodium dodecyl benzene sulfonate, nonionics such as alkylphenoxypoly (ethylenoxy) ethanol having alkyl groups of about seven to about twelve carbon atoms, and the like, ampholytics such as coconut fatty acid amide, coconut fatty acid amide condensates, etc., freeze-thaw recovery agents such as the lower alkylene glycols, alkali-fast colorants such as Hansa yellow dyes, phthalocyanine blues and greens, red or yellow oxide or iron toners, and toluidine reds.

Ordinarily, the latex paints are manufactured with some or all of these ingredients, i.e., freeze-thaw stabilizers, coalescents, antifoams, and also can have in them a fungicide, a thickner-stabilizer such as hydroxyl ethyl cellulose, and various anionic and nonionic surfactants.

One advantageous composition of this invention, i.e., having the best combination of rheological properties, hiding power and economy, has the following components in the ranges indicated:

| Component | Weight % |
|---|---|
| Water | 19 to 25 |
| 30% solution of phenyl mercuric acetate | 0.025 to 0.05 |
| hydroxy propyl methyl cellulose | 0.1 to 0.5 |
| ethylene glycol | 0.0 to 2.5 |
| diethylene glycol monobutyl acetate | 0.0 to 2.0 |
| sodium salt of polymeric carboxylic acid | 0.5 to 1.5 |
| sodium phosphate (metophosphate or hexametaphosphate) | 0.04 to 0.3 |
| nonionic surfactant | 0.12 to 0.5 |
| Defoamer L-475 (trade designation of a defoamer made by Drew Chemical Co.) | 0.2 to 1.0 |
| titanium dioxide | 8.0 to 16.0 |
| sodium silico-aluminate | 0.8 to 3.0 |
| crystalline silica | 8.0 to 20.0 |
| calcium carbonate | 7.0 to 18.0 |
| magnesium aluminum silicate | 0.2 to 0.5 |
| 2,2,4-trimethyl 1,3-pentanediol monoisobutyrate | 0.0 to 1.5 |
| Plasticizer 135 (Eastman Chemical Products) | 0.0 to 1.5 |
| acid containing acrylate polymer emulsion | 0.2 to 0.8 |
| ammonium hydroxide | 0.08 to 0.4 |
| vinyl acrylic copolymer latex | 10.0 to 35.0 |

Compositions containing the above-set-forth ingredients in the ranges indicated are characterized in having a yield value of from about 95 to about 550 dynes/cm² and a shear stress of at least 90 dynes/cm² at a shear rate of between about 0.1 and about 0.2 reciprocal seconds.

The compositions of this invention can be applied by airless spray apparatus to a surface in up to about 60 mils thickness or more in successive passes of from about 5 mils to about 15 mils thickness or more, without substantial sagging or slumping of the wet composition film.

A conventional airless spray apparatus is used to force the coating composition through a spray tip by hydraulic pressure, atomizing the coating composition as they exit from the spray tip. Ordinary internal mixed air sprays use compressed air to atomize the liquid and then forces the atomized liquid through a spray tip. The coating compositions of this invention have viscosity and rheological properties such that they cannot be advantageously applied by an ordinary aerosol air spray. Preferably the coating compositions of this invention are applied by an airless spray apparatus which creates pressure on the liquid coating composition forcing it through a spray tip where it is atomized after exiting the spray tip.

The following examples are intended to illustrate the invention but not to limit the scope thereof, parts and percentages being by weight unless otherwise specified.

EXAMPLE 1

An aqueous latex was made by emulsion polymerization of vinyl acetate monomer and 2-ethyl hexyl acrylate monomer by feeding these monomers into the balance of the mixture which was agitated and heated to 140° F. to initiate the reaction. The kettle used was equipped with a distilling column maintained at total reflux. The reaction period was 14 to 16 hours. The proportions of reaction mixture were as follows:

| | Lbs. |
|---|---|
| Deionized Water | 90.00 |
| Sodium bicarbonate | 0.47 |
| Sodium dodecyl benzene sulfonate | 1.51 |

| | |
|---|---|
| Nonionic surfactant[1] | 3.67 |
| Hydroxy ethyl cellulose having in 2% water solution at 20°C. a viscosity of 8 to 12 cups | 1.00 |
| Potassium persulfate | 0.23 |
| 2-ethyl hexyl acrylate monomer | 18.00 |
| Vinyl acetate monomer[2] | 82.00 |

[1] A blend of 1.51 lbs. of iso-octyl phenoxy polyethoxy ethanol containing 9 to 10 ethylene oxide units per mole of the alkyl phenol and 2.16 lbs. of a similar compound except that it contained about double the moles of ethylene oxide units per mole of the alkyl phenol.

[2] Stabilized with 0.002 percent of hydroquinone.

A 35.0 pound portion of the resulting aqueous latex, containing about 55 percent latex solids, was maintained in a discrete package.

A pigment base was made of the following listed components by premixing them in a hammer mill in the following proportions:

| | Lbs. |
|---|---|
| titanium dioxide having an average particle size of 0.25 micron | 16.0 |
| sodium silico-aluminate having an average particle size of 0.022 micron | 0.2 |
| crystalline silica having a particle size range between 5 microns and 50 microns and averaging 30 microns | 20.0 |
| calcium carbonate having an average particle size of 5 microns | 17.5 |
| magnesium aluminum silicate having an average particle size of 0.14 micron | 0.5 |
| 30 percent solution of phenyl mercuric acetate | 0.09 |
| diethylene glycol monobutyl ether acetate | 1.0 |
| Ethylene glycol | 1.0 |
| hydroxypropyl methyl cellulose | 0.15 |
| sodium salt of polymeric carboxylic acid | 0.80 |
| sodium phosphate (or metaphosphate or hexametaphosphate) | 0.10 |
| nonionic surfactant [alkylphenoxypoly (ethyleneoxy) ethanol] | 0.30 |
| Defoamer L-475 (trade designation of a defoamer made by Drew Chemical Co.) | 0.50 |
| 2,2,4-trimethyl-1,3-pentanediol monoisobutyrate | 1.0 |
| Plasticizer 135 (Eastman Chemical Products) | 0.50 |
| acid-containing acrylic copolymer emulsion | 0.4 |
| ammonium hydroxide | 0.2 |

This pigment was packaged, the package unit of 61.9 pounds emptied into a mixture container containing 26.3 pounds of water, and the whole stirred by hand with a paddle for about 3 minutes. Then the 35.0-pound package of aqueous compounded latex was emptied into the resulting slurry, and the stirring was continued for about 2 minutes whereby 10 gallons of aqueous latex emulsion composition were made.

The above-described composition had a yield value of 170 dynes/cm$^2$, and had a shear stress of 175 dynes/cm$^2$ at a shear rate of 0.2 reciprocal seconds.

After about 5 minutes of standing, the coating composition was sprayed by airless spray on a Morest test card in a thickness of 60 mils in successive passes of 5 mils to 15 mils thickness.

There was substantially no sagging or slumping apparent at this coating thickness. Hiding power was excellent; there was no showthrough of the Morest card patterns.

EXAMPLE 2

The procedure of Example 1 was repeated using the same pigment base and a different latex.

The latex was prepared as follows:

To a cylindrical container equipped with heating and cooling coils, means for passing a purging gas stream through the contents of the container, and a mechanical stirrer, there were added the following ingredients in the order listed.

Ingredients:                  Parts by Weight (Pounds):

| | | | |
|---|---|---|---|
| Water | | | 112.0 |
| Triton[1] X-100 | | | 4.0 |
| Ultrawet[2] K | | | 1.5 |
| K$_2$S$_2$O$_8$ | | | 0.7 |
| Styrene | 95.5 | | |
| 2-EHA* | 41.0 | | 136.5 |

* 2-Ethyl Hexyl Acrylate

[1] A condensation product of polyethylene oxide and octyl phenol having 8 ethylene oxide groups per molecule--Trademark of Rohm & Haas Co.

[2] Sodium dodecyl benzene sulfonate--Trademark of Atlantic Refining Company.

Prior to and during the addition of styrene and 2-ethyl hexyl acrylate which were added over a period of about 90 seconds, nitrogen gas was sparged through the container and the contents of the container were vigorously stirred. The stirring was continued for 4 hours until substantially all of the styrene and the acrylate had polymerized into distinct particles. During the polymerization the temperature o4 the contents of the container was maintained at 60° C. by means of a cooling coil.

The hiding power and rheological properties of this coating composition were substantially the same as those observed for the coating composition of Example 1.

EXAMPLE 3

The procedure of Example 2 was repeated using the same pigment base and a different latex.

The latex was prepared from the following ingredients:

| Ingredients: | | Parts by Weight (Grams): |
|---|---|---|
| Water | | 82.0 |
| Triton X-100 | | 3.0 |
| Lithium Stearate | | 1.0 |
| K$_2$S$_2$O$_8$ | | 0.5 |
| Styrene | 70 | 100.0 |
| 2-EHA* | 30 | |

* 2-EHA-2-Ethyl hexyl acrylate

Nitrogen gas was sparged into the container and the solution was agitated during the addition of the styrene and 2-Ethyl hexyl acrylate which occurred over a 60-second period. The temperature of the contents in the container was permitted to rise to 50° C. and maintained throughout the polymerization, which took place over a 3½-hour period.

The hiding power and rheological properties of this coating composition were substantially the same as those observed for the coating composition of Example 2.

What is claimed is:

1. A latex paint composition consisting essentially of a film-forming latex polymer of at least one emulsion polymerized ethylenically unsaturated monomer and at least one pigment dispersed in a bodied aqueous medium, said composition being characterized by a yield value within the range of 95–550 dynes/cm$^2$ which is sufficiently low to permit the composition to be atomized by airless spray equipment, wherein "yield value" is defined by $T_0$ in the equation $$X = T_0/P \cdot g$$

where $X$ = wet film thickness of the slumping section in centimeters $P$ = density in gm/cc $g$ = gravitational constant 980 cm/sec$^2$ and,
a shear stress of at least 90 dynes/cm² at a shear rate within the range of about 0.1 to about 0.2 reciprocal seconds, which is sufficiently high to support without significant sagging or slumping, a vertically oriented wet film of said composition of up to 60 mils thickness when deposited in successive passes each laying down 5-15 mil thick wet films, wherein shear stress is defined as the shear force per unit area of paint film, expressed in dynes/cm².

2. The composition as defined in claim 1 wherein said polymer is formed of two ethylenically unsaturated monomers.

* * * * *